Oct. 7, 1952     R. F. MORRISON     2,612,851
CANDY MAKING EQUIPMENT
Filed April 7, 1947     13 Sheets-Sheet 1
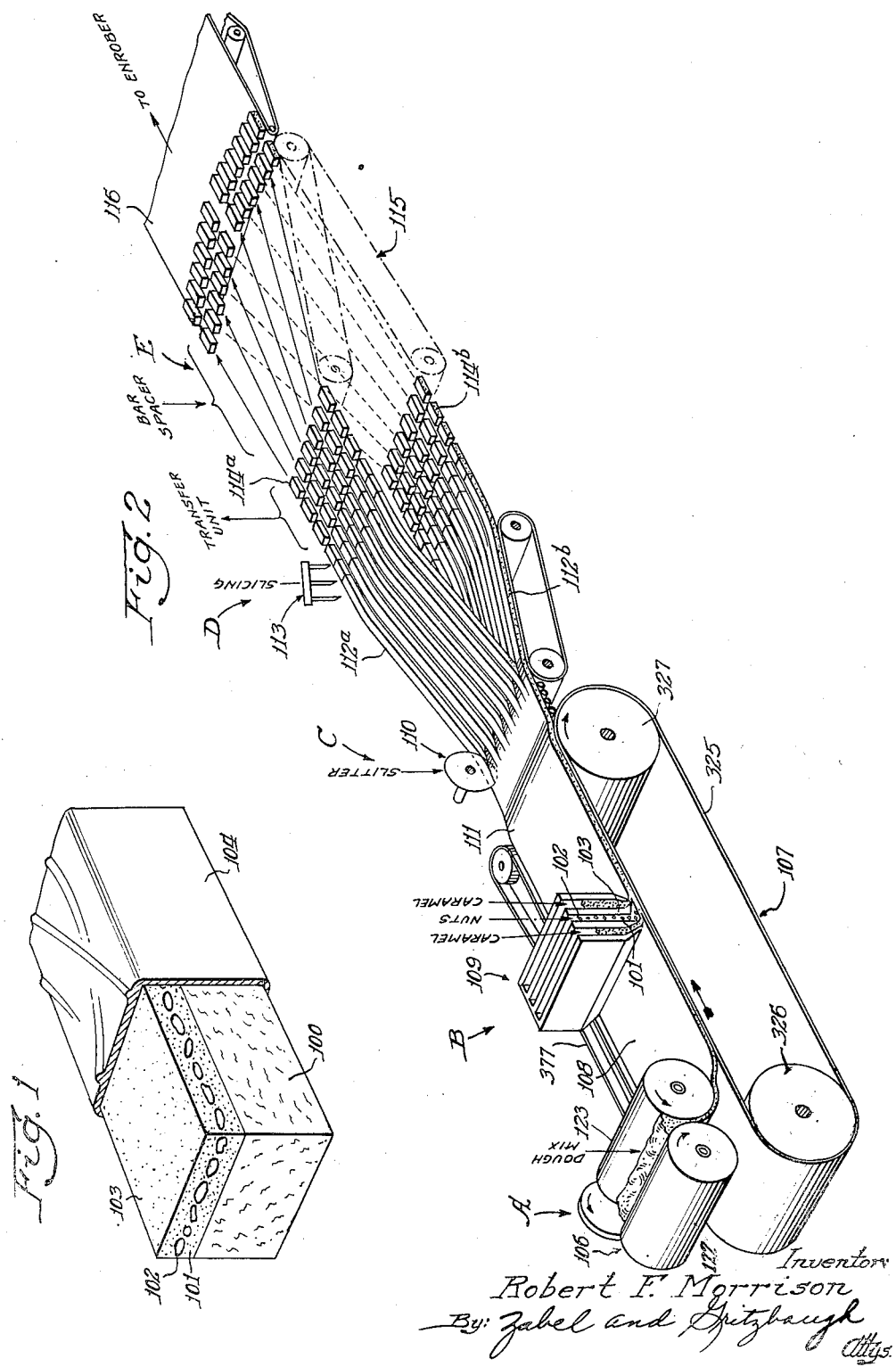

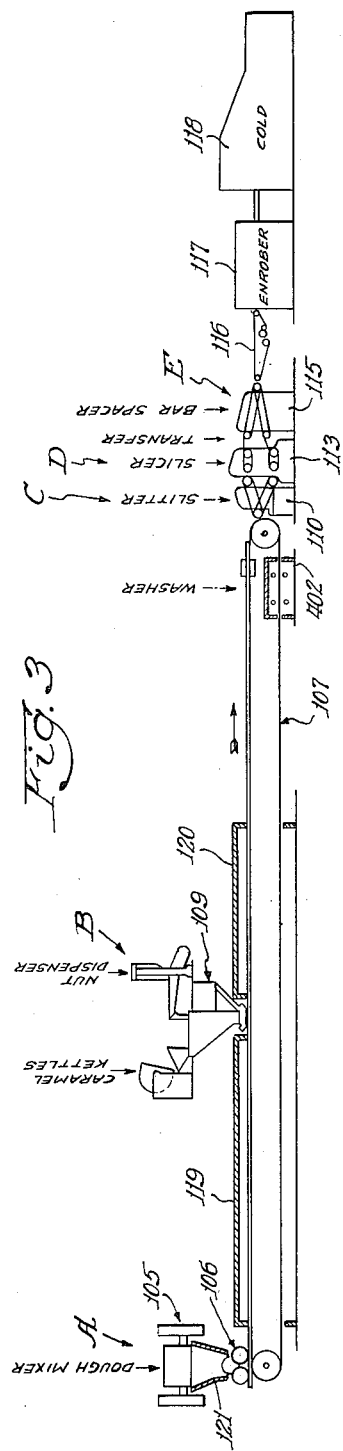
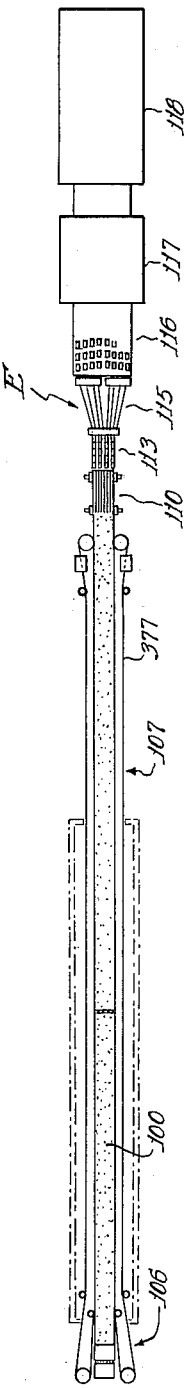
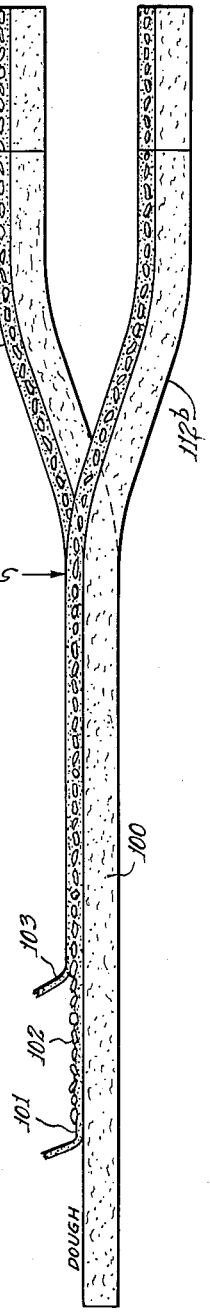

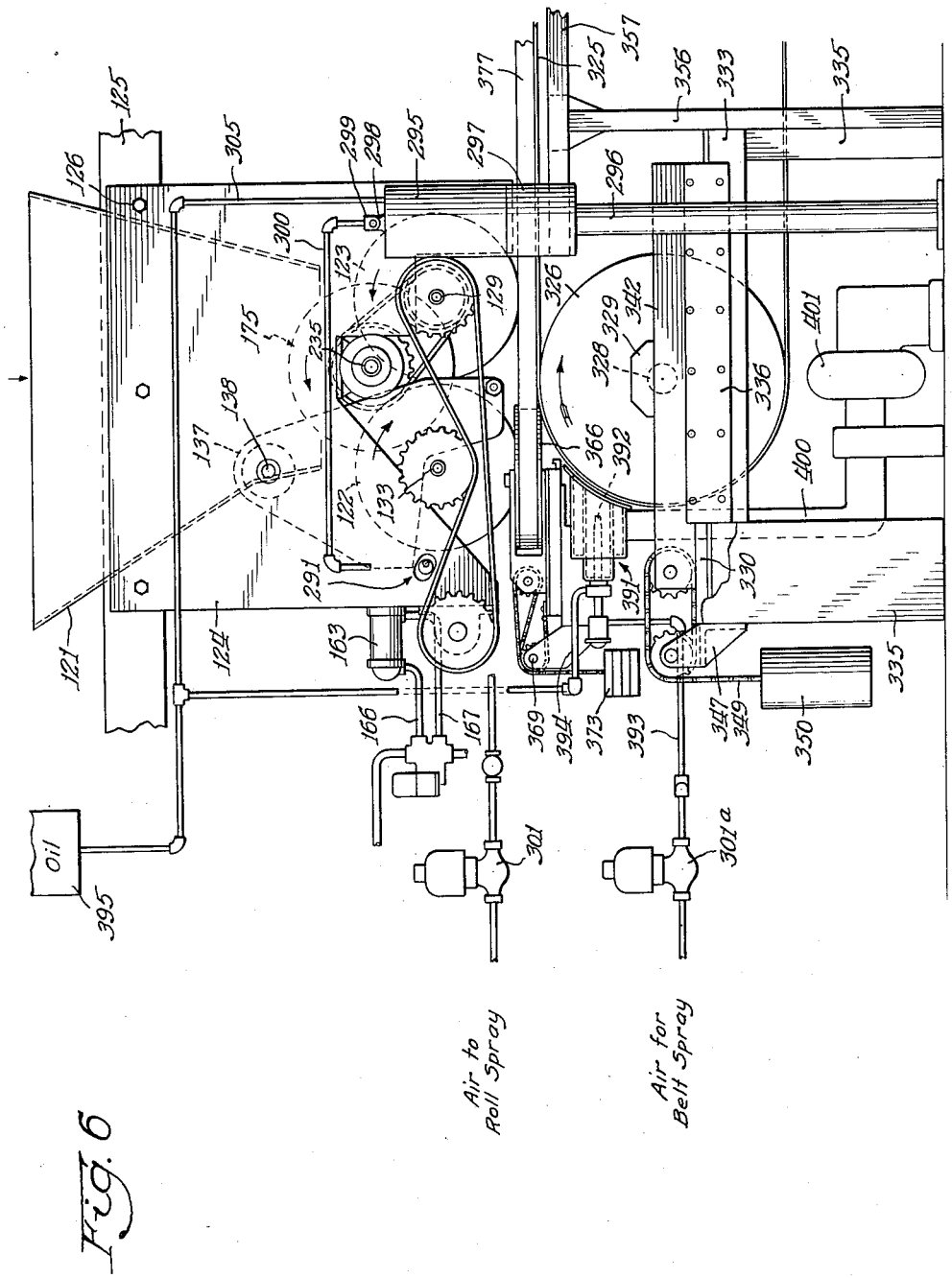

Oct. 7, 1952     R. F. MORRISON     2,612,851
CANDY MAKING EQUIPMENT
Filed April 7, 1947     13 Sheets-Sheet 4
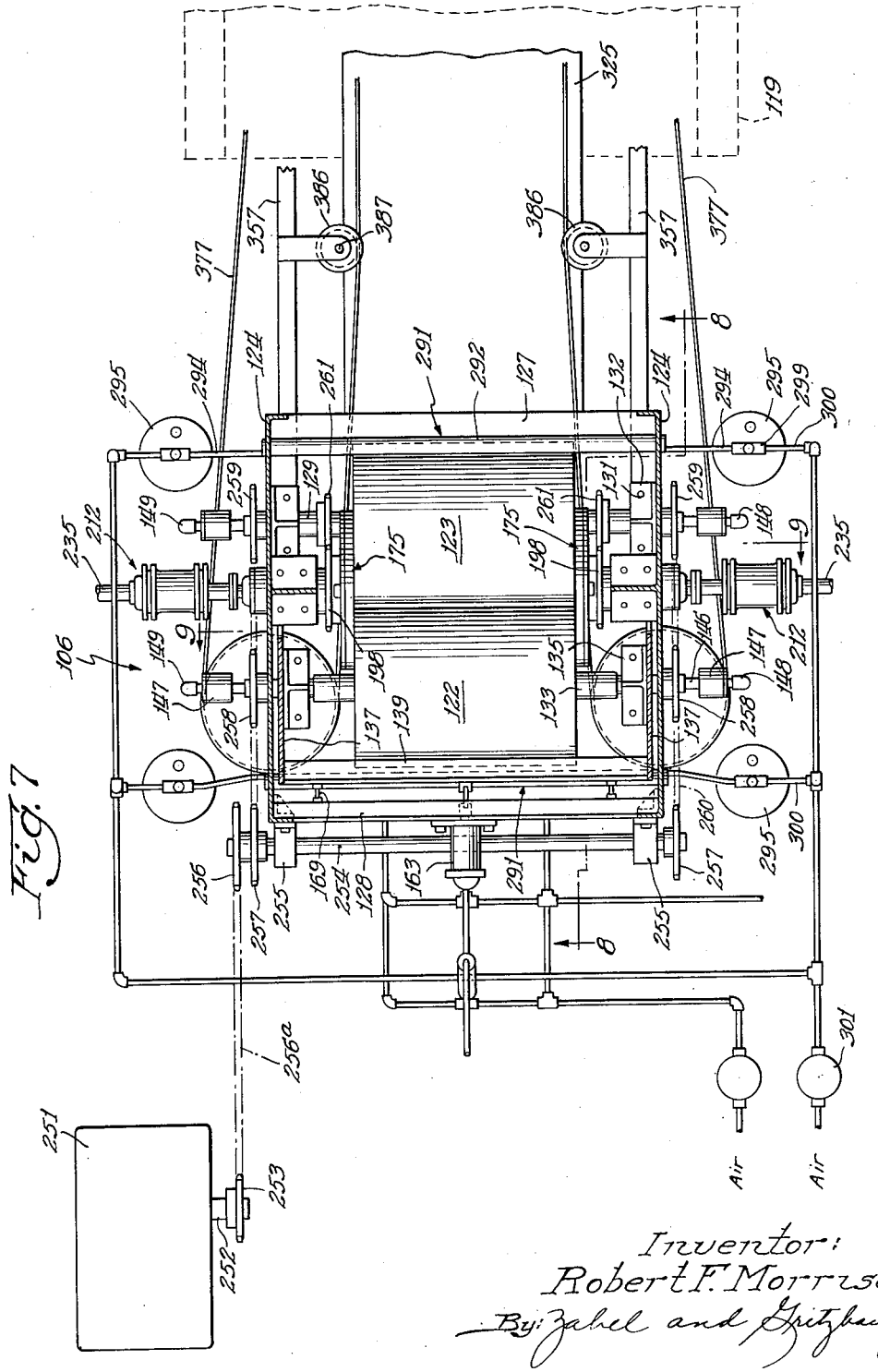
Inventor:
Robert F. Morrison
By: Zabel and Fitzbaugh
Attys.

Oct. 7, 1952 R. F. MORRISON 2,612,851
CANDY MAKING EQUIPMENT
Filed April 7, 1947 13 Sheets-Sheet 5

Inventor:
Robert F. Morrison
By Zabel and Fitzbaugh
Attys.

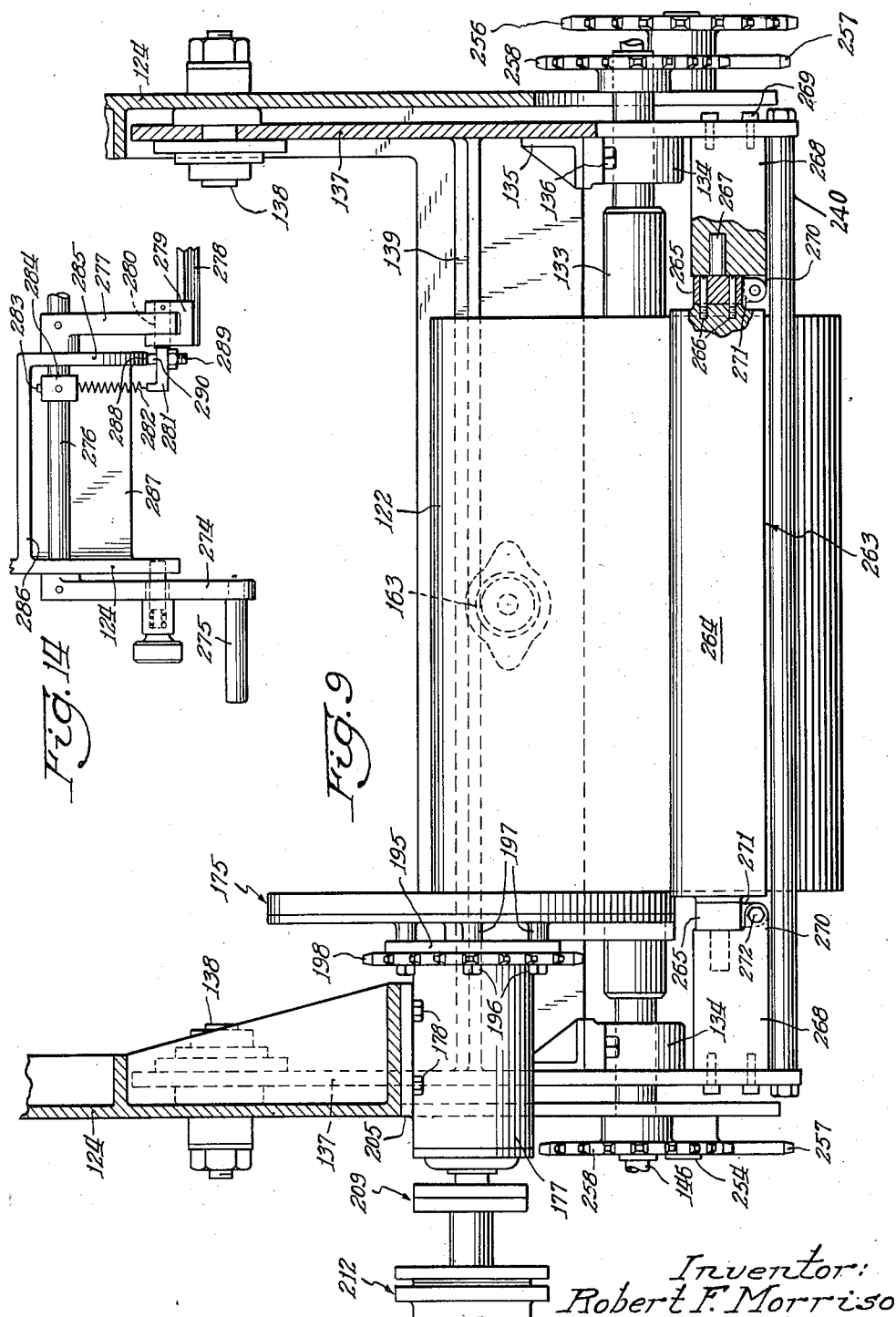

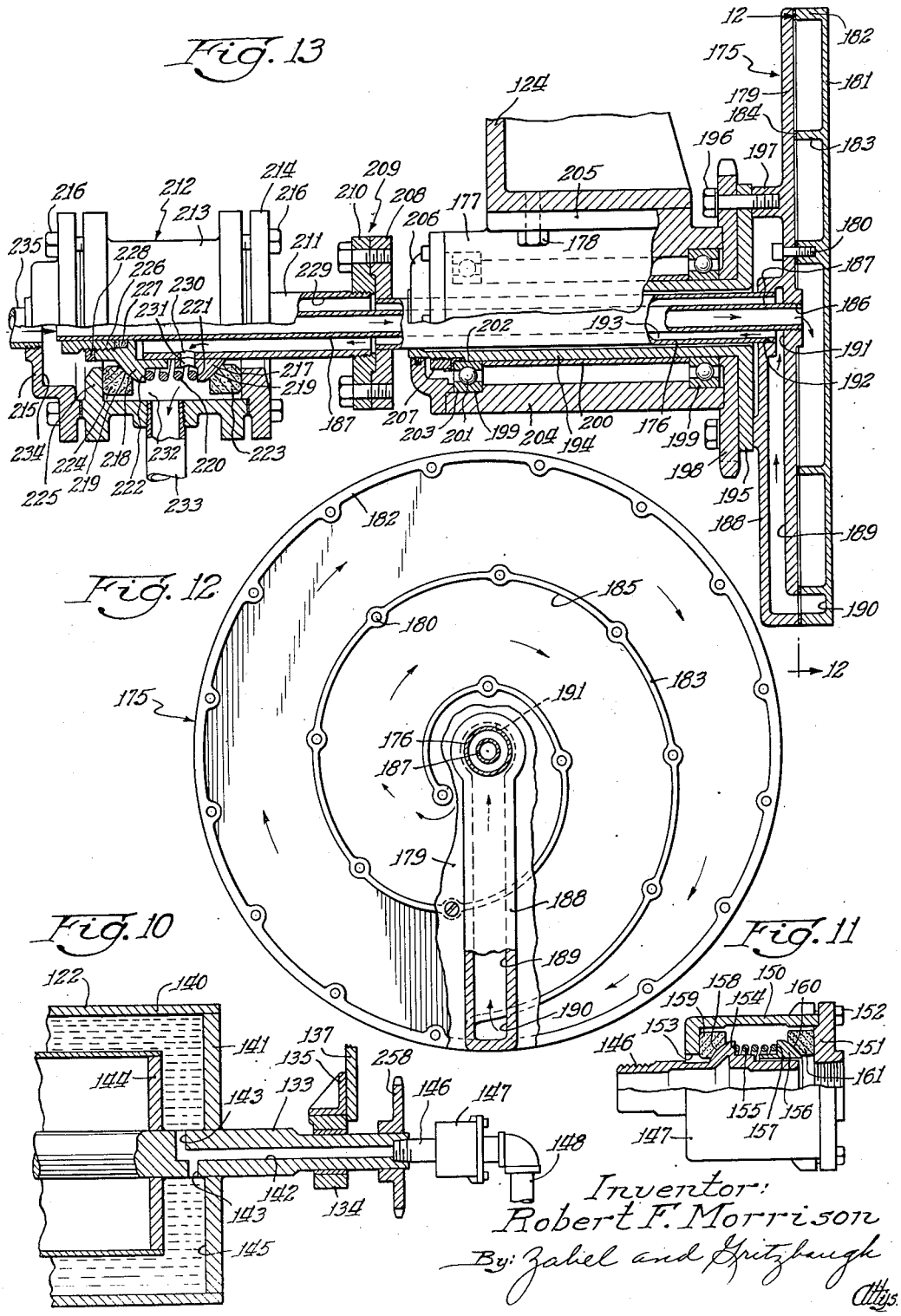

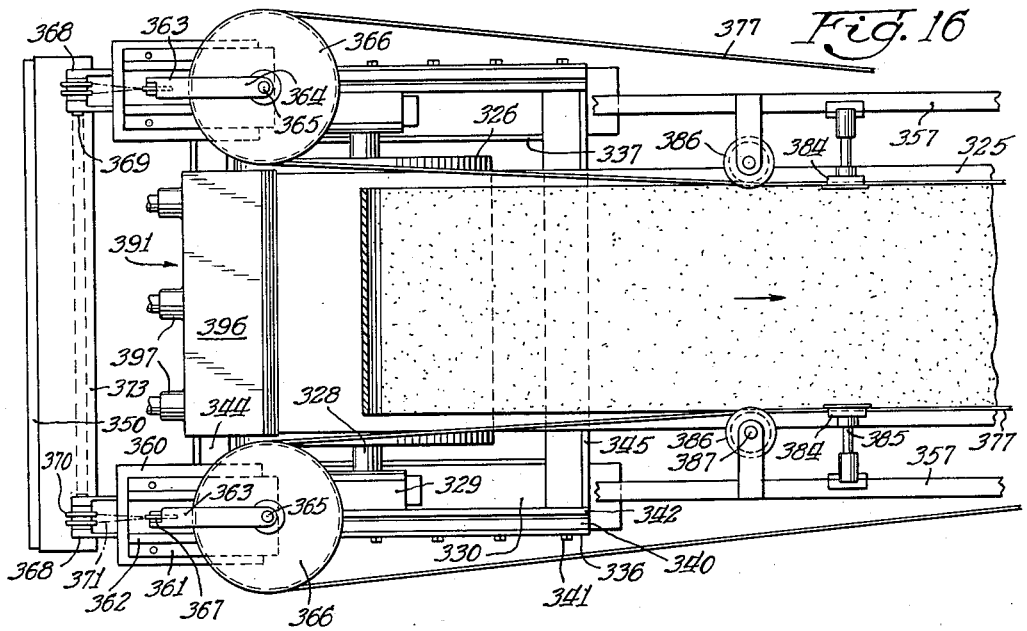
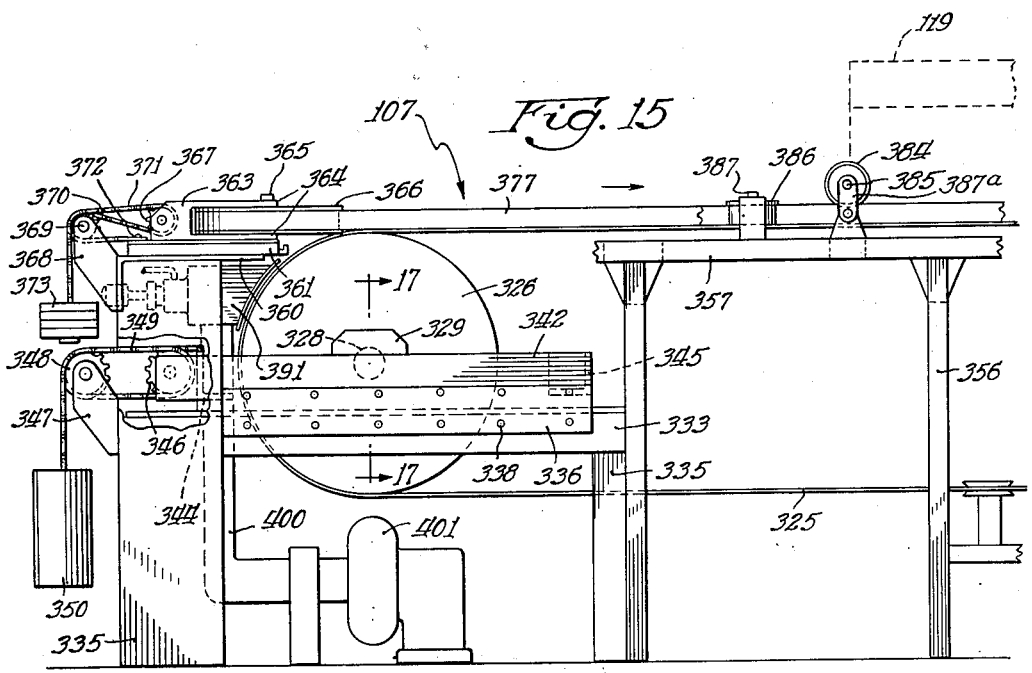

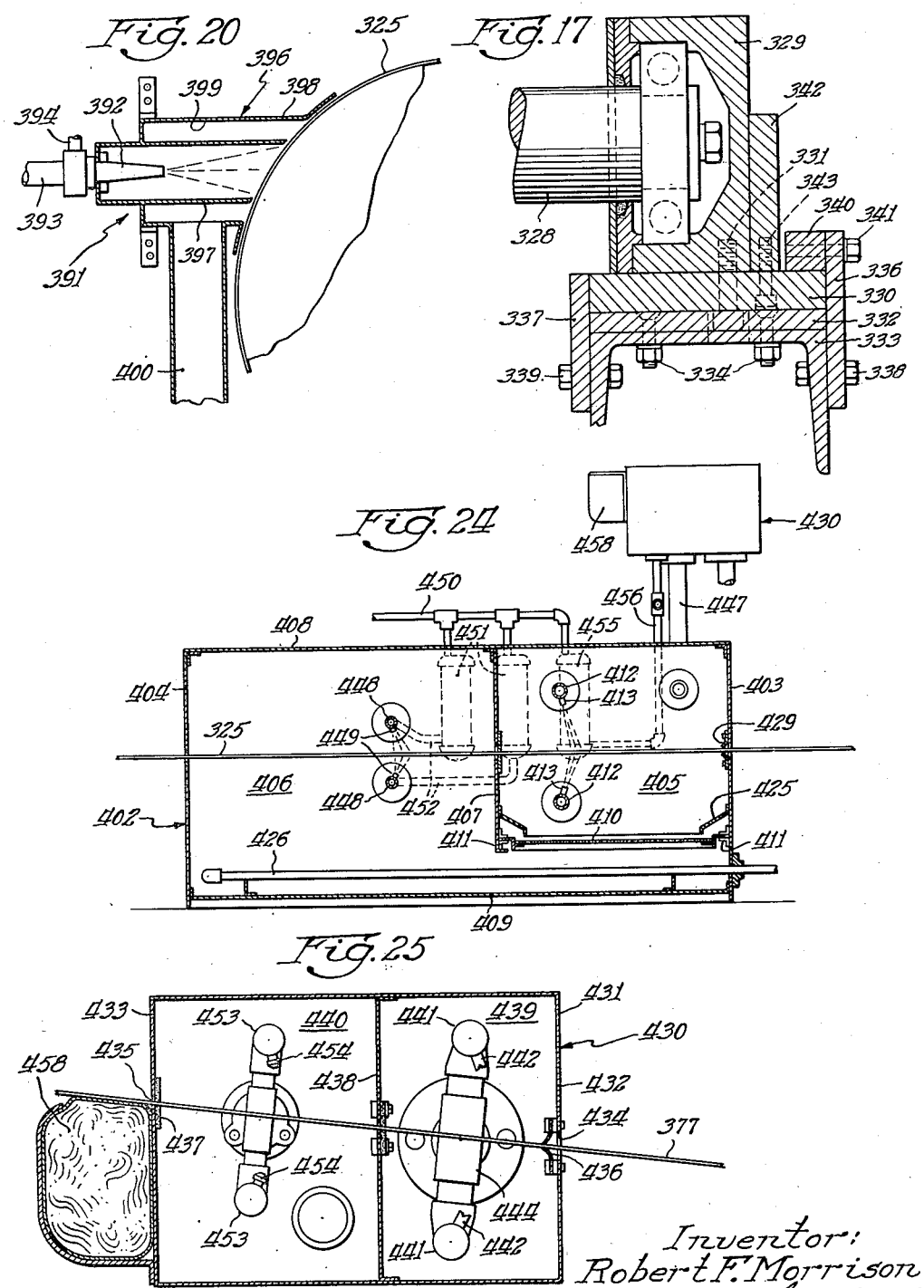

Inventor:
Robert F. Morrison
By: Zabel and Fitzbaugh
Attys.

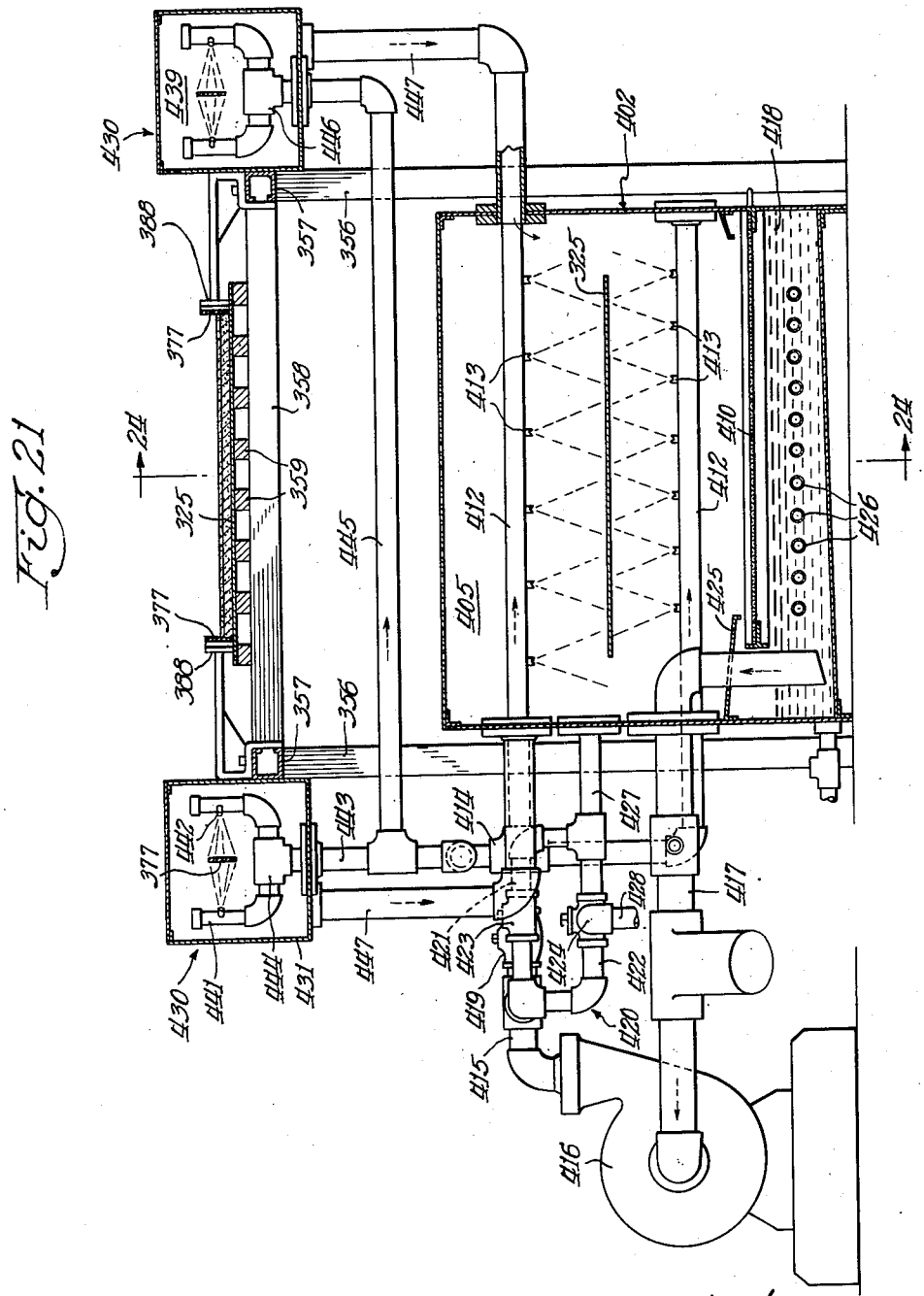

Oct. 7, 1952   R. F. MORRISON   2,612,851
CANDY MAKING EQUIPMENT
Filed April 7, 1947   13 Sheets-Sheet 12

Inventor:
Robert F. Morrison
By: Zabel and Gritzbaugh
Attys.

Oct. 7, 1952 R. F. MORRISON 2,612,851
CANDY MAKING EQUIPMENT
Filed April 7, 1947 13 Sheets-Sheet 13

Inventor:
Robert F. Morrison
By: Zabel and Fitzbaugh
Attys

Patented Oct. 7, 1952

2,612,851

UNITED STATES PATENT OFFICE 2,612,851

CANDY MAKING EQUIPMENT

Robert F. Morrison, Oak Park, Ill., assignor to Mars, Incorporated, Chicago, Ill., a corporation of Delaware Application April 7, 1947, Serial No. 739,869

7 Claims. (Cl. 107—12)

1

The present invention is concerned with the manufacture of candy bars and relates primarily to the spreading of a dough-like mixture of nougat into a sheet of uniform width and thickness. The invention contemplates that the dough is first prepared and thoroughly mixed and whipped in one or more batch mixes or the like, and is then dumped into a hopper that includes a pair of spaced spreader rollers and rotating end discs that have chilled surfaces coming in contact with the candy dough. The candy when first dumped into the hopper is relatively hot and is soft and sticky but upon coming in contact with the chilled rollers a slightly hardened surface or skin is formed on those portions of the candy that engage the chilled rollers.

The candy dough is fed between the spaced spreader rollers and emerges from the rollers in the form of a flat strip that corresponds in width with the width of the rollers and in thickness with the distance between the rollers. This candy is deposited upon a moving belt conveyor and is conveyed away from the spreader rollers at a rate of speed corresponding to the speed at which the dough is discharged from the rollers.

It is important that this resulting sheet of nougat be of uniform thickness throughout its length and width. The hardened surface or skin formed by the chilled rollers on the sheet of nougat is disposed on the top, bottom and side faces of the sheet thus deposited upon the conveyor. The conveyor moves the nougat sheet through various stations where operations are performed resulting ultimately in a finished candy bar.

The products thus manufactured are chocolate coated candy bars of uniform size containing a nougat center and perhaps other layers of caramel and nuts variously arranged.

The nougat comprises a cooked mixture including sugar, corn syrup, egg whites, vegetable oil, salt, water, malted milk and cocoa that are whipped and cooked until the proper consistency is obtained. The nougat portion of the resulting candy bars is filled with a multitude of air cells resulting from the whipping operation so as to preserve the light consistency of the nougat.

The foregoing constitute some of the principal objects and advantages of the present invention, others of which will become apparent from the following description and the drawings, in which Fig. 1 is a perspective view showing a typical candy bar, with a portion of the chocolate coating removed, that can be made as a result of the method disclosed hereinafter;

2

Fig. 2 is a more or less schematic view illustrating the various stages through which the candy passes when manufactured in accordance with the present method;

Fig. 3 is a diagrammatic view of the candy making machinery used in carrying out the present method;

Fig. 4 is a plan view of the equipment shown in Fig. 3;

Fig. 5 is a more or less schematic side view of the candy illustrating the progress of the candy manufactured under the present method from the point where the dough is first spread out onto the conveyor until it is separated into ribbons and the ribbons separated and cut into bar lengths;

Fig. 6 is an enlarged side elevational view of the dough spreading equipment;

Fig. 7 is a top plan view of the equipment shown in Fig. 6;

Fig. 9 is an enlarged, fragmentary transverse sectional view through the spreader roller assembly, the view being taken on the line 9—9 of Fig. 7 and being shown partly in elevation;

Fig. 10 is an enlarged, fragmentary, longitudinal sectional view taken through one roller such as 122 and its associated shaft assembly;

Fig. 11 is an enlarged detail view, shown partly in section, of the pressure joint illustrated in Fig. 10;

Fig. 12 is an enlarged end view of one of the discs 175, a portion of the disc being broken away and shown in section;

Fig. 13 is an enlarged vertical transverse sectional view taken through one of the discs 175 and through its associated bearing and shaft;

Fig. 14 is an enlarged fragmentary side elevational view of the stripper mechanism that operates against roller 122;

Fig. 15 is a side elevational view of one end only of the conveyor 107 illustrated diagrammatically in Fig. 2;

Fig. 16 is a plan view of the portion of the conveyor illustrated in Fig. 15 with nougat shown on the conveyor;

Fig. 17 is an enlarged vertical sectional view taken through a portion only of the conveyor, the view being taken on the line 17—17 of Fig. 15;

Fig. 20 is an enlarged vertical sectional view illustrating one of the oil jet assemblies employed to spray the conveyor belt;

Fig. 21 is a transverse sectional view through the conveyor, the view being taken on the line 21—21 of Fig. 18;

Fig. 24 is a vertical longitudinal sectional view through the washing chamber or housing through which the conveyor belt passes, the conveyor belt being shown in elevation;

Fig. 25 is an enlarged horizontal sectional view taken through one of the side belt washing housings, the view being taken on the line 25—25 of Fig. 18.

Figure 8:
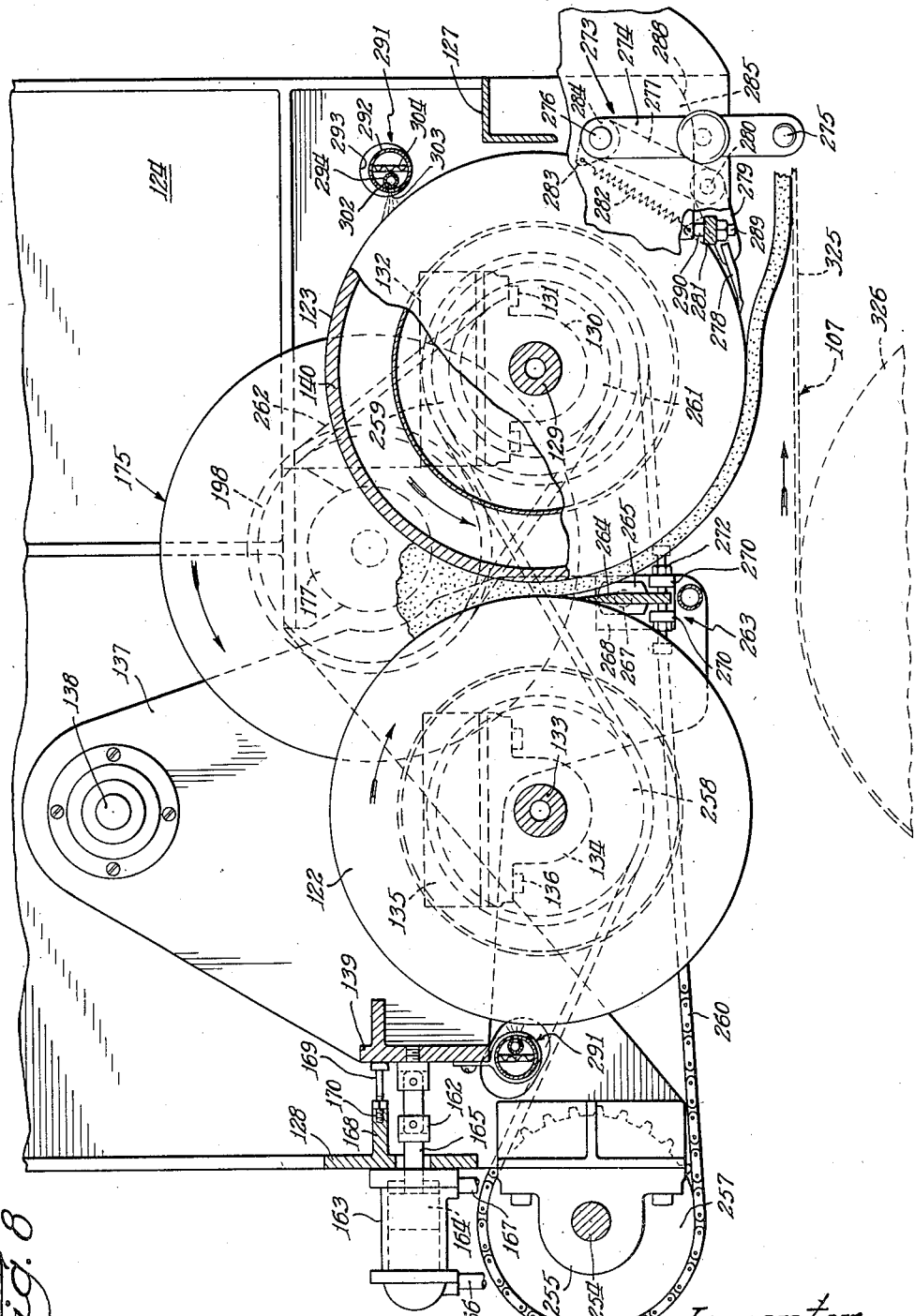
Fig. 8 is an enlarged fragmentary longitudinal sectional view through the spreading equipment shown in Figs. 6 and 7, a portion of the view being illustrated in side elevation, the view being taken on the line 8—8 of Fig. 7.

For purposes of illustration one embodiment of the present invention will be described, it being recognized however that many modifications may be made in the specifically illustrated form of the invention without departing from the intended scope of the invention.

Certain subject matter contained herein also appears in my copending application, Serial No. 768,025, filed August 11, 1947.

GENERAL ORGANIZATION

For purposes of illustration the present invention will be described in connection with the preparation of a bar of candy of the type disclosed in Fig. 1. Such a bar comprises a layer of nougat 100 on top of which is disposed a layer of caramel 101 having a layer of nuts 102 thereon, which in turn are covered by a second layer of caramel 103. The entire bar is coated or enrobed with chocolate 104.

Referring to Fig. 2 bars of this type are manufactured continuously by a series of steps that are performed at various stations including stations A to E inclusive indicated in Fig. 2.

The method and equipment described herein can be used to make candy bars comprising a wide variation of ingredients put together in accordance with many different formulae, such for example as caramel, toffee, marshmallow and nougat, or a combination of these materials. Specifically speaking, the nougat is a batter-like mix made of aerated egg whites and a syrup of sugar, salt, water and corn syrup; and after thoroughly beating this mix to provide additional aeration, vegetable oil, malted milk and cocoa are added and all are thoroughly mixed together. This nougat mix or dough is introduced through a spreader device generally indicated at 106. The operation of spreading this nougat onto a conveyor 107 is accomplished at station A and the nougat thus spread takes the form of a relatively wide sheet 108 of nougat that is of a predetermined uniform thickness throughout its entire area. The conveyor 107 moves this sheet 108 of nougat in the direction indicated by the arrow in Fig. 2.

At station B the two layers 101 and 103 (see Fig. 1) of caramel with the layer of nuts 102 held therebetween are laid on top of the sheet of nougat 108 by means of a caramel and nut dispenser generally indicated at 109 (see Figs. 2 to 5 incl.). The moving conveyor 107 thereafter carries combined layers of nougat, caramel and nuts 100 to 103 inclusive, into a plurality of slitting knives generally indicated at 110 where at station C, the combined sheet 111 of nougat, caramel and nuts are slit lengthwise into ribbon-like strips of candy 112a and 112b, which are separated as shown in Fig. 2 into upper and lower strips.

As best shown in Fig. 2 the odd numbered strips, as for example, the first, third and fifth, etc, strips reading from right to left on the drawing are caused to travel downwardly and are identified as strips 112b whereas the even numbered strips, namely, 2, 4, and 6, etc., are caused to travel upwardly to an upper elevation and are identified as strips 112a. This vertical separation of the strips is brought about so as to space the candy a sufficient distance apart to prevent the strips from sticking together again after they have passed the cutting discs. The cutting discs do not remove any candy but merely slit and displace the candy in the separating operation. The strips are then cut into bar lengths, which operation is accomplished by means of a slicing machine generally indicated at 113 at station D. The bars thus cut are illustrated at 114a and 114b in Fig. 2, the former being disposed at the upper elevation and the latter bars are disposed at the lower elevation. These spaced and cut bars 114a and 114b are then returned to a common plane by means of a bar spacer generally indicated at 115 at station E. The bar spacer not only returns the bars 114a and 114b to a common plane but also spaces these bars so that they are deposited in the common plane with adjacent bars disposed at the proper distance apart for the chocolate enrobing operation to be performed. The bars leaving the bar spacer 115 are deposited upon a conveyor 116 that causes the bars deposited thereon to travel at a slightly greater speed than the speed of the bars on the bar spacer 115 so as to effect endwise spacing between adjacent bars. The conveyor 116 then moves the bars to a chocolate coating or enrobing machine indicated at 117 in Fig. 3 from which the bars are conveyed through a suitable cooling chamber 118 and finally onto the bar wrapping equipment (not shown).

The nougat dough that is introduced onto the conveyor 107 at station A is necessarily warm and relatively soft so that the sheet 108 of nougat passing from station A to station B travels into a cooling chamber 119 (see Fig. 3) that chills and hardens to a certain extent the nougat preparatory to depositing the caramel and nut spread thereon at station B. Likewise the caramel and nut layer deposited at station B is warm and relatively soft and therefore the candy leaving station B is caused to travel through a cooling chamber 120 before the candy is brought to the slitters at station C.

STATION A

Spreader equipment

Referring to Fig. 3 the batch mixer 105 discharges its contents through a chute 121 into the spreader device generally indicated at 106.

The spreader device 106 is best shown in Figs. 6 to 14 inclusive and comprises generally a pair of rollers 122 and 123 that are mounted on spaced side walls 124, which in turn are suspended from overhead beams, one of which is indicated at 125 in Fig. 6 by means of rivets or bolts 126. The spaced walls 124 form two sides of a rectangular frame, the other two sides being made up of framing members including an angle beam 127 (Fig. 8) and beam 128. The roller 123 is mounted on a shaft 129 that is supported by means of bearings 130 directly on the spaced walls 124, the bearings 130 being bolted as at 131 (Fig. 8) to an angle bracket 132. These angle brackets may be spot welded or otherwise secured to the walls 124.

The roller 122 is likewise mounted on a shaft 133 that is journalled in bearings 134 (Fig. 8) at the opposite ends of the shaft, each bearing 134 being secured to an angle bracket 135 by means of bolts 136. Each of the angle brackets 135 is spot welded or otherwise secured to a swinging arm 137 (Figs. 7 and 8), there being two of these arms spaced apart with one adjacent to each of the spaced walls 124. Each of the arms 137 is pivotally secured to the wall 124 by means of a pin 138 and the arms 137 are connected by a framing member 139 (see Fig. 8) and a spacer bar 240 (see Fig. 9).

As best shown in Fig. 10 each of the rollers 122 and 123 comprises a hollow drum 140 closed by end walls 141. The shaft 133 (or 129 in case of roller 123) passes throughout the length of the drum 140 and is provided with an axial passage 142 at each end thereof that extends from the free end of the shaft to a position just inside the adjacent end wall 141, at which latter position, a plurality of radial passages 143 extend to the peripheral surface of the shaft. Since the rollers 122 and 123 are identical, roller 122 only is shown and described herein. Mounted on the shaft 133 within the drum 140 is an internally closed drum 144. Between the walls of the drum 144 and the walls of the roller 122 is a passage 145 that extends throughout the length of the roller 122 and is situated closely adjacent to the outer walls of the roller 122.

Referring to Figs. 7 and 10 a hollow stud shaft or pipe 146 is threaded into each end of the shaft 133 and projects into a rotary pressure joint 147. A cooling water supply pipe 148 is connected to couplings 147 at one side of the roller 122 and is adapted to introduce water or like coolant through the pressure joint 147 at one side of the roller 122 (or 123), through the hollow stud shaft 146, passages 142 and 143, into the passage 145 in the roller 122 (or 123). This water circulates through the passage 145 to the opposite end of the roller where it leaves through the passages in a corresponding shaft 133, pressure joint 147 and finally is discharged through an outlet pipe 149. As previously mentioned the roller 123 is identically provided with passages so that water or other coolant may be circulated in the same manner through this roller 123.

The pressure joint 147 comprises a housing 150 (Fig. 11) provided with an end closure wall 151 bolted to the housing as at 152. The opposite end of the housing 152 is provided with an aperture 153 through which the stud shaft 146 projects. The inner free end of the stud shaft 146 is provided with an annular shoulder portion 154 that serves as one seat for a compression spring 155. A ring member 156 is disposed over the free end of the stud shaft 146 and is provided with a complementary shoulder portion 157 that serves as the other seat of the compression spring 155 but ring 156 is slidable longitudinally along the shaft 146. The shoulder portion 154 of the stud shaft 146 is provided with an arcuate bearing surface 158 that rests against a seal ring 159 that is disposed between the bearing surface 158 and the adjacent end wall of the housing 150. Similarly the shoulder portion 157 of the ring member 156 is provided with an arcuate bearing surface 160 that rests against a seal ring 161 that is disposed between the bearing surface 160 and the removable end cap 151. The compression spring 155 at all times exercises force against the shoulder portions 154 and 157 so as to maintain a constant pressure of the bearing surfaces 158 and 160 against the corresponding sealing rings 159 and 161. Thus the stud shaft 146 is adapted to rotate in the housing 150, the bearing surfaces 158 and 160 sliding over the corresponding surfaces of the seal rings 159 and 161. These seal rings 159 and 161 prevent leakage of water from the housing 150.

Referring to Figs. 7 and 8 the roller 122 is adapted to move away from or toward the roller 123. This is made possible because the roller 122 is mounted upon the swinging arms 137 as previously described. The swinging arms 137 are operatively connected by means of a link 162 to an air cylinder 163, the latter of which is supported on the beam 128. A piston 164 operates in the air cylinder 163 and is carried on the free end of a piston rod 165, the latter of which is secured to the link 162. The air cylinder 163 has pipes 166 and 167 leading therefrom, the pipes being disposed on opposite sides of the piston 164. The beam 128 has an inwardly extending ledge 168 that carries thereon a plurality of adjustable stops 169 that are adapted to engage the framing member 139 that is integral with the swinging arms 137. Thus by conveying compressed air through pipe 167 into the air cylinder 163 the piston 164 is moved to the left so as to swing the arms 137 about their pivot points 138 in a clockwise direction until this movement is limited by the stops 169. This position of the arms 137 is maintained by the air pressure in the cylinder 136 and in this manner the spacing between the rollers 122 and 123 is kept constant and at a predetermined distance. The amount of this spacing of course can be adjusted by moving the stops 169, since these stops are threaded as at 170 into the ledge 168. The rollers 122 and 123 can be brought together by passing compressed air through the pipe 166 and discharging air from the pipe 167, thereby moving the piston 164 to the right and thus swinging the arms 137 in a counterclockwise direction. This corresponds to a closed or shut-off position of the spreader rollers 122 and 123 and can be maintained by simply maintaining sufficient air pressure through the supply pipe 166 to hold the rollers 122 and 123 together. A solenoid operated valve 171 (see Fig. 26) selectively controls the flow of air through either the pipe 166 or pipe 167.

Operating against the end walls of the spreader rollers 122 and 123 are a pair of rotatable discs, one being disposed at each end of the pair of rollers 122 and 123. Each of these rotatable discs 175 is mounted on a shaft 176 that is supported in a bearing 177. Each bearing is secured to the corresponding spaced walls 124 by bolts or the like 178 as shown in Fig. 13. The details of the rotatable discs 175 and their respective mountings and connections are identical and for this reason one only will be described.

As best shown in Fig. 13 each of the discs 175 comprises a back plate portion 179 to which is fastened by means of screws 180 a housing portion 181 that is provided with peripheral sides 182 and an intermediate spiral shaped partition member 183. The sides 182 of the spiral partition 183 project inwardly in the housing 181 and engage the back plate portion 179. Sealing gaskets 184 rest between the back plate 179 and the sides 182 and the spiral wall portion 183. This spiral wall portion 183 together with the side wall 182 of the housing 181 cooperate to form a spiral passage indicated in Fig. 12 at 185 that starts at approximately the center of the disc 175 and spirals about over the area of the disc terminating adjacent to the outer periphery of the disc close to the side wall 182. The back plate 179 is apertured at 186 (Fig. 13) to receive a pipe 187 that is threaded into the aperture 186. This pipe 187 serves as an inlet port for conducting a fluid into the spiral passage 185 in a manner to be described hereinafter. Formed integrally with the back plate 178 is a housing member 188 that provides a radial passage 189 that communicates with the outermost extremity of the spiral passage 185 at the position indicated at 190 and extends toward the central axis of the disc 175 to a position adjacent to the pipe 187 where it enters an annular chamber 191. The housing member 188 is apertured at 192 (Fig. 13) to receive the shaft 176 that is mounted circumferentially about the pipe 187 providing an annular passage 193 therebetween. This annular passage 193 communicates with the chamber 191 and serves as an outlet port for conveying fluid from the radial passage 189 in a manner to be described hereinafter.

The bearing member 177 supports the shaft 176 on the wall 124 and comprises a sleeve 194 that is flanged at one end as indicated at 195. This sleeve 194 is mounted circumferentially about the shaft 176 and the flange 195 is apertured to receive a plurality of screws 196 that rigidly secure flange portion 195 to lugs 197 that project from the back plate 179. A sprocket wheel 198 is mounted on the sleeve 194 that is rigidly secured to the disc 175 by means of the screws 196 that pass through apertures in the sprocket wheel 198. Likewise mounted on the sleeve 194 are a pair of ball bearing race members 199 that are held in spaced apart relationship by sleeve 200 that surrounds the sleeve 194. Each ball bearing race member 199 is provided with a plurality of ball bearings 201 that operate between an inner rotating annular member 202 and an outer fixed annular member 203. Mounted on the outer fixed annular members 203 of the ball bearing race members 199 is a sleeve 204 that is provided with suitable flanges 205 to receive the screws or bolts 178 for attachment to the wall 124. The sleeve 204 at one end abuts against the sprocket wheel 198 and at the other end is closed by an end cap 206. A ring nut 207 is threaded onto the end of the sleeve 194 and against the adjacent ball bearing race member 203 so as to urge the race member firmly against the spacing sleeve 200 thereby holding together the bearing assembly. Suitable gaskets and the like are employed where needed. The shaft 176 projects to a position just beyond the end cap 206 of the bearing 177 and is provided on its free end with a coupling plate 208. This coupling plate 208 forms a part of a coupling member generally indicated at 209 shown in Figs. 7 and 13. A complementary coupling plate 210 is bolted to the first plate 208. The coupling plate 210 is apertured to receive a stud shaft 211 that is threaded into place. This stud shaft 211 enters a rotary pressure joint generally indicated at 212 in Figs. 7 and 13.

The pressure joint 212 comprises a cylindrical housing portion 213 closed at its opposite ends by means of end caps 214 and 215 that are bolted in place as at 216. The stud shaft 211 terminates within the housing 213 and surrounding this shaft 213 is a pair of annular bearing members 217 and 218 that are fixed with respect to the stud shaft 211. The bearing members 217 and 218 are adapted to slide longitudinally along the stud shaft 211 and each is provided with a spherical bearing surface 219. A compression spring 220 is seated between cooperating shoulder portions 221 and 222 on the bearing members 217 and 218 respectively and is adapted to urge the bearing members 217 and 218 in opposite directions. A pair of sealing rings 223 and 224 are disposed against the bearing faces 219 of the bearing members 217 and 218 respectively. The ring 223 is held by the bearing member 217 against the end wall 214 whereas the ring 224 is urged by the bearing member 218 against an annular flange 225 that projects inwardly from the housing 213. The bearing member 218 projects beyond the end of the stud shaft 211 and closely surrounds the pipe 187 that passes through the pressure joint 212 and terminates just short of the end cap 215. A bushing 226 is threaded into the free end of the bearing member 218 against a gasket 227 that is urged against the bearing member 218. A lock nut 228 may be provided to lock the bushing 226 in place.

As best shown in Fig. 13 the stud shaft 211 is spaced from the pipe 187 so as to provide an annular passage 229 that communicates with the passage 193. A plurality of apertures or ports 230 are provided in the stud shaft 211 inside the housing 220 and complementary ports 231 are provided in the bearing member 217 and are aligned with the ports 230. A chamber 232 surrounds the bearing member 217 and is in communication with the passage 229 through the ports 230 and 231. An outlet pipe 233 is adapted to discharge fluid from the chamber 232 of the pressure joint 212.

The end cap 215 of the pressure joint 212 is spaced from the free end of pipe 187 so as to provide a chamber 234. Threaded into a central aperture in the end cap 215 is an inlet pipe 235. Chambers 234 and 232 are sealed apart from each other by means of the ring member 224 that is constantly held under pressure between the bearing member 218 and the flange 225 by the compression spring 222.

Thus has been described the disc 175 and its complete assembly. This disc 175 together with its shaft 176, the coupling 208, the stud shaft 211 and the bearing members 217 and 218 are adapted to rotate whereas the housing 204 of the bearing 177 and the housing 213, including the ends walls 214 and 215, are stationary. Bearing members 217 and 218 rotate with their bearing surfaces 219 moving over the adjacent faces of the rings 223 and 224.

Each of the discs 175 is adapted to be cooled or chilled by circulating therethrough a cooling fluid or liquid. This coolant is supplied through each inlet pipe 235 (see Figs. 7 and 13) and enters chamber 234 at the inlet end of the adjacent pressure joint 212 (Fig. 13). The coolant then passes through the pipe 187 to the center of the disc 175 where it enters the spiral passage 185 in the disc 175. The disc 175 is normally rotated in the manner to be described hereinafter as shown in the direction of the arrows of Fig. 12 so that the coolant enters the spiral passage 185 and is confined by walls 183 to follow through the spiral passages to the outer periphery of the disc 175. The coolant then enters the radial passage 189 through port 190 and is forced through the passage 189 into the chamber 191 and then through the annular passage 193 in the shaft 176 into passage 229 in the stud shaft 211. The coolant then is forced through ports 230 and 231 into the chamber 232 in the pressure joint 212 and then leaves the pressure joint 212 through the outlet pipe 233. This coolant as it passes through the spiral passage 185 in each of the discs 176 chills the face of the disc 175.

The rollers 122 and 123 and the discs 175 are powered by a suitable motor or power unit 251 (see Fig. 7) that is provided with a shaft 252 on the end of which is mounted a sprocket wheel 253. A rotatable shaft 254 is journalled in bearings 255 adjacent to its opposite ends that are mounted in some suitable manner on the walls 124. Mounted at one end of the shaft 254 is a sprocket 256 that is powered by a sprocket chain 256 a operating about the sprocket wheel 253 on the motor shaft 252. A pair of sprocket wheels 257 likewise are mounted on the shaft 254, one being adjacent to each end of the shaft 254. A sprocket wheel 258 is mounted adjacent to each end of the shaft 146 that carries the roller 122 and a sprocket wheel 259 is mounted adjacent to the opposite end of the shaft 146 that carries the roller 123. A sprocket chain 260 (Figs. 7 and 8) is mounted in driving relationship with the sprocket wheels 257, 258 and 259 as best shown in Fig. 8 so that the rollers 122 and 123 are powered adjacent to each end of their shafts, the power being received from the motor 251. Mounted on the shaft 129 that supports the roller 123 at adjacent opposite ends of the roller are sprocket wheels 261, each of which is disposed in alignment with the corresponding sprocket wheel 198 carried by the shaft 176. As best shown in Fig. 8 a sprocket chain 262 operates about the sprocket wheels 198 and 261 so that the shaft carrying the discs 175 is powered through suitable sprocket wheels and chain from the shaft carrying roller 123.

Roller 122 as shown in Fig. 8 is caused to rotate in a clockwise direction, whereas roller 123 is rotated in a counterclockwise direction. Candy dough that comprises the nougat portion 100 (Fig. 1) of the candy bar is thus moved downwardly between the rollers 122 and 123 and is pressed into a ribbon or sheet having a thickness corresponding to the distance between the rollers 122 and 123. This sheet of nougat is deposited from the rollers onto the moving conveyor generally indicated at 107. This conveyor 107 moves in a direction from left to right as indicated by the arrow in Fig. 8 so that the ribbon or sheet of candy when it rests on the conveyor 107 is advanced from left to right. Thus as the candy leaves the rollers 122 and 123 it immediately bends to the right as shown in Fig. 8 and follows the surface of the roller 123 until it leaves the roller at about its lowermost position.

In order to prevent a sticking of the candy onto roller 122 a scraper device generally indicated at 263 as best shown in Figs. 8 and 9 is provided. This scraper mechanism comprises a scraper blade 264 that is securely fastened at its opposite ends to bearing blocks 265 by some suitable means, such as screws 266 (see Fig. 9). Each of the bearing blocks 265 is provided with a bearing member 267 that is journalled in a stationary member 268, the latter stationary member being rigidly secured by means of screws or the like 269 to the adjacent arm 137. The blade 264 is thus adapted to pivot about the bearing member 267 in the stationary member 268. Each of the stationary members 268 is provided with a pair of ears 270 which together form a bifurcated portion between which ears a projection 271 on the bearing block 265 is disposed. The ears 270 are spaced from each other a sufficient distance so that the projection 271 may have relative oscillating movement during the pivotal movement of the blade 264. An adjusting nut 272 (Fig. 8) forming a stop, projects through each of the ears 270. These nuts 272 can be adjusted so as to fix the position of the blade 264 with respect to the roller 122 and during the operation of the machine it is desired that the upper edge of the blade 264 be disposed closely adjacent to the peripheral surface of the roller 122 so as to serve as a stripper thereby preventing the nougat dough from following the roller 122 beyond the position desired.

The roller 123 is likewise provided with a stripper mechanism generally indicated at 273 (see Figs. 8 and 14). This stripper mechanism includes an arm 274 having a handle 275 at one end thereof. The arm 274 is fixed to the end of a shaft 276 that passes through the lower end of the wall 124. This shaft 276 extends to the opposite wall 124 and is journalled therein. Fixed to the shaft 276 is a pair of spaced blade supporting arms, one of which is shown at 277 in Fig. 14. The stripper blade is indicated at 278 and at its opposite ends it is secured to the lower ends of arms 277 by means of links 279. Each of the links 279 is pivoted as at 280 to its respective arm 277 and each link 279 is provided with a projection 281 adjacent to its outer free end, to the end of which projections is fastened a tension spring 282. The opposite end of the tension spring 282 is fastened at 283 to a collar 284 that is fixed to the shaft 276. Thus the spring 282 constantly urges the blade 278 upwardly tending to rotate the link 279 in a clockwise direction about its pivot point 280. Spaced inwardly from each of the walls 124 is a parallel wall 285 that is connected to the wall 124 by a horizontal wall portion 286 and is reenforced by a web 287. The lower edge of the wall 285 provides a cam surface as best shown in Fig. 8 at 288. The projection 281 on each of the links 279 is provided with an adjustable stop 289 that has a cam follower portion 290 adapted to ride on the cam surface 288. Thus in the position shown in Fig. 8 the blade 278 being constantly urged upwardly by the spring 282 is fixed in its position relative to the surface 288 by engagement of the cam follower 290 on the cam stop 289 against the cam surface 288. In this manner, by adjustment of the stop blade 289, the blade 278 may be properly located with respect to the peripheral surface of the roller 123. To withdraw the stripper blade 178 from the roller 123 the crank arm 274 may be rotated in a counterclockwise direction (Fig. 8) thereby moving the cam follower member 290 along the cam surface 288. The stripper blade may be returned to the position shown in Fig. 8 by merely reversing the operation by turning the crank arm 274 in a clockwise direction.

A thin film of some suitable vegetable oil is spread on the cylindrical surfaces of rollers 122 and 123 in order to prevent the nougat dough from sticking to the rollers. To accomplish this an oil spray device generally indicated at 291 is provided for each roller. The two spray devices 291 are identical and for present purposes one only will be described in detail. Each of such device comprises a casing 292 that is disposed closely adjacent to its respective peripheral surface of the roller 122 or 123 and extends parallel with respect to the cylindrical surface of the roller. The casing 292 is supported in apertures 293 in the spaced walls 124. Mounted in the casing 292 is an oil spray pipe 294 that is disposed on the side of the casing 292 close to the adjacent roller 122 or 123. This oil spray pipe 294 extends throughout the length of the casing 292 and projects beyond each end thereof as best shown in Fig. 7. Adjacent to each end of the casing 292 is an oil supply drum 295 that is mounted as shown in Fig. 6 on a pedestal 296. In the lower portion of the oil spray drum 295 may be located a heater element in the region indicated at 297, the details of the heater element not being shown inasmuch as they form no part of the present invention. On the top of each oil drum 295 is a riser 298 that communicates with the interior of the drum. An ejector generally indicated at 299 is mounted on the top of the riser 298 and the pipe 294 (Fig. 7) is connected to one side of the ejector 299. The other side of the ejector 299 is attached to an air supply line 300 that receives air from a compressor (not shown), the flow of air being regulated by a valve indicated at 301. As indicated in Fig. 8 the oil supply pipe 294 is provided with a longitudinally extending slit 302 that is disposed adjacent to the roller 122 or 123, as the case may be, and the length of this slit corresponds with the length of the roller. The casing 292 is likewise provided with a slit 303 that is aligned with the slit 302. Thus air from the supply line 300 is moved through the ejector 299 into the oil supply pipe 294, this air carrying with it a supply of heated oil from the oil supply tank 295. The oil thus conveyed is in the form of a mist or cloud and is under pressure so that when it reaches the longitudinal slit 302 in the region adjacent the roller 122 or 123 the cloud or mist of oil is spread upon the cylindrical surface of the adjacent roller. As illustrated in Fig. 7 the oil is introduced through both ends of each supply pipe 294 so that the distribution of oil on the rollers 122 and 123 is substantially uniform throughout the extent of the surface of each roller. The oil tank 295 is supplied with oil from reservoir 305 through pipe 305.

A heating filament 304 may be mounted in the casing 292 closely adjacent to the oil supply pipe 294 in the region of the slit 302 so as to maintain the proper temperature of the oil that is being sprayed upon the surface of each of the rollers 122 and 123.

The conveyor 107

The conveyor 107 is best shown in Figs. 6 and 15 to 25 inclusive. As diagrammatically shown in Figs. 2 and 3 the conveyor 107 comprises generally a conveyor belt 325 that operates about a pair of spaced drums or rollers 326 and 327. As shown in Figs. 6 and 15 to 17 inclusive the drum or roller 326 is mounted on a shaft 328 that is journalled in bearings 329. The bearing 329 is mounted on a horizontal plate 330 (see Fig. 17), the bearing being fixed to this plate by means of screws, one of which is illustrated at 331. Plate 330 is slidably mounted on a plate 332, the latter of which is rigidly secured to a channel member 333 by means of bolts 334. This channel member 333 is supported on a structure including vertical uprights 335 (see Figs. 6 and 15) which extend upwardly from the floor. Plates 336 and 337 are fixed to the opposite faces respectively of the channel 333 by means of bolts 338 and 339 (see Figs. 6, 15 and 17). Both of the plates 336 and 337 project upwardly above the channel member 333 so as to abut the sides of plates 330 and 332 thus serving as guides within which the plate 330 slides on plate 332. A hold-down block 340 fixed at 341 to the upper edge of plate 336 rests against the top face of plate 330 so as to hold this plate 330 downwardly against plate 332. Each of the bearing members 329 rests against an upstanding plate 342 that is secured by means of screws 343 to plate 330. The shaft 328 is adapted to rotate in the bearing members 329.

As best shown in Figs. 6 and 15 each of the plates 342 projects beyond the corresponding vertical plate 336 and an angle member 344 forms a transverse framing member that connects the two spaced plates 342 adjacent to the free ends thereof. An angle member 345 connects the opposite ends of the spaced plates 342. A sprocket wheel 346 is journalled in the free end of each of the plates 342. Mounted on one of the upstanding framing members 335 are a pair of spaced brackets 347, one of which is aligned with each of the ratchet wheels 346. A sprocket wheel 348 is rotatably mounted in each of the brackets 347. A sprocket chain 349 having one end fixed with respect to the sprocket wheel 346 operates about the sprocket wheels 346 and 348 as shown in the drawings and is provided with a weight 350 suspended from the free end of each of the sprocket chains 349. In this manner a mechanical advantage is provided through the system of sprocket wheels 346 and 348 and the sprocket chain 349 so as to exert a suitable pulling force on the plates 342 thereby maintaining the belt 325 in a taut condition. This is accomplished by virtue of the fact that the plate 330 (Fig. 17) that is fixed to the corresponding plate 342 is slidable on plate 332.

Figure 19:
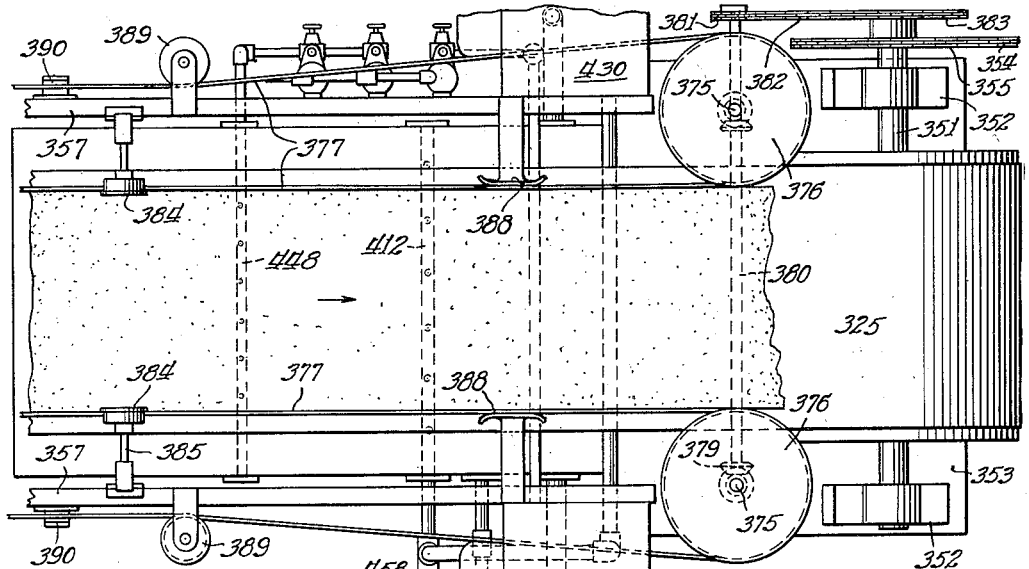
Fig. 19 is a plan view of the portion of the conveyor shown in Fig. 18.
Figure 18:
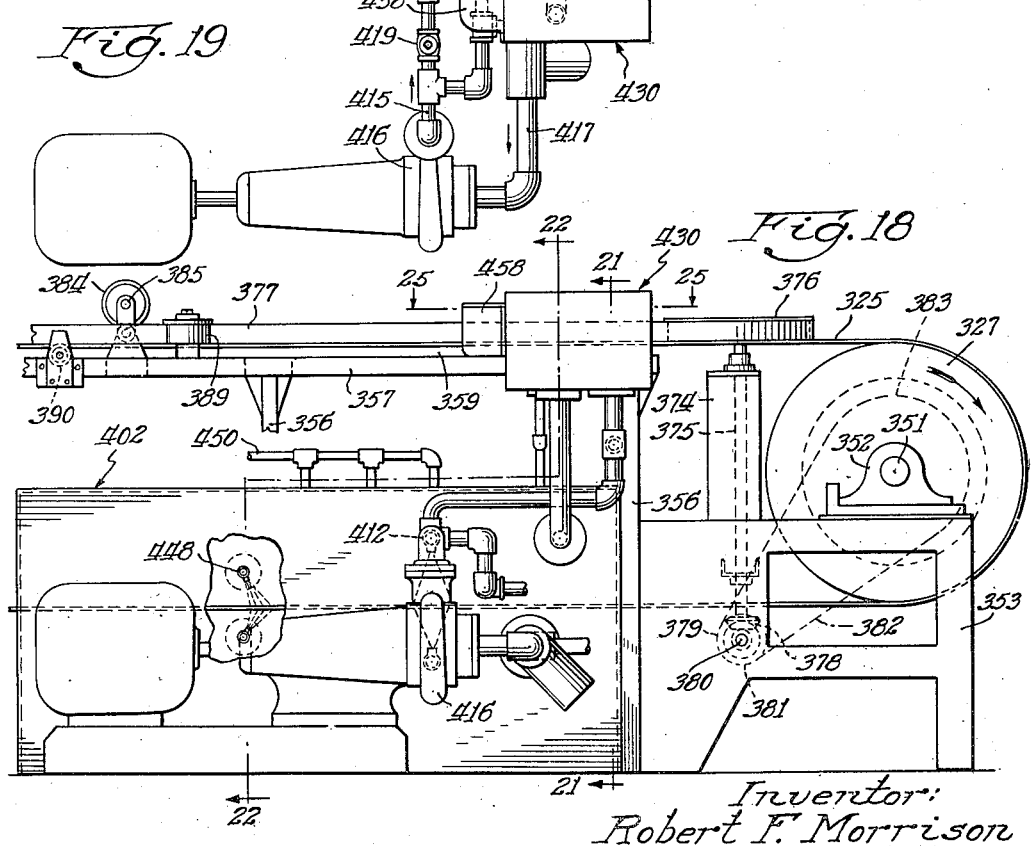
Fig. 18 is a side elevational view corresponding

As shown in Figs. 18 and 19 the opposite end of the belt 325 passes over the drum or roller 327. This drum 327 is mounted on a shaft 351 which in turn is journalled in a pair of spaced bearings 352. These bearings 352 are mounted on a suitable framework 353. The shaft 351 is rotated by a suitable motor drive that includes a chain 354 (Fig. 19) operating about a sprocket wheel 355.

A framework is provided for supporting the length of the conveyor belt 325 and comprises a plurality of spaced upright posts 356 that are disposed along the length of the belt adjacent to each side thereof. Longitudinal channel like framing members 357 (see Figs. 15 and 21) are fixed to the upper ends of the posts 356 and cross framing members 358 connect the spaced longitudinal channel members 357 and are spaced lengthwise thereof. A plurality of longitudinal supporting stringers 359 are mounted on the cross framing members 358 and extend substantially throughout the length of the belt 325. These stringers 359 are spaced transversely with respect to the belt 325 and form a floor or table surface upon which the belt rides in its travel from a position adjacent to the uppermost extremity of the roller 326 to a position adjacent to the uppermost extremity of the roller 327.

Again referring to Figs. 15 and 16 mounted on the top of the left hand uprights 335 is a platform 360 upon which is fixed a plate 361 that is provided with a pair of spaced, parallel raised guide ribs 362. Slidably mounted between the spaced guide ribs 362 is a bearing member 363 that is bifurcated so as to provide upper and lower jaws 364 (Fig. 15) for receiving a vertical shaft 365. A roller 366 is rotatably mounted on the shaft 365. On the other end of the bearing member 363 is rotatably mounted a sprocket wheel 367. A bracket 368 is mounted on the left hand upright 335 in alignment with each of the sprocket wheels 367 and a shaft 369 is journalled in each of the brackets 368. Sprocket wheels 370 are mounted on the shaft 369 in alignment with the corresponding sprocket wheels 367 and a sprocket chain 371 fixed at one end as at 372 operates about each set of sprocket wheels 367, 370, and suspended from the free ends of the sprocket chains 371 are a plurality of weights 373. Thus a constant pulling force is applied on the bearing member 363 so as to urge the roller 366 in a direction toward the left hand end of the structure shown in Fig. 16.

A pair of upstanding columns 374 (Figs. 18 and 19) is mounted on the framework 353 that is disposed on the opposite end of the conveyor and journalled in each of the columns 374 is a vertical shaft 375 on the end of which is mounted a roller 376. Thus it is noted that a pair of rollers 366 and 376 is disposed on each side of the conveyor structure and a side belt 377 operates around each pair of such rollers. These side belts 377 are disposed vertically so as to provide upstanding sides to the horizontal belt conveyor 325 as best shown in Fig. 21.

The lower end of each of the vertical shafts 375 (Figs. 18 and 19) is provided with a bevelled gear 378 that meshes with a corresponding bevelled gear 379 mounted on a horizontal shaft 380 that is journalled in the supporting structure 353. Mounted on one end of the horizontal shaft 380 is a sprocket wheel indicated at 381 about which operates a sprocket chain 382 that is powered from the end of shaft 351 through a driven sprocket wheel 383.

The side belts 377 extend substantially throughout the full length of the conveyor belt 325 and each side belt is guided by a plurality of suitable rollers 384 that are spaced throughout the length of the conveyor. Each of the rollers 384 is mounted on a shaft 385 that is supported on the longitudinal channel members 357, and engages the top edge of the corresponding side belt 377 so as to maintain the belt in upright position and hold the belt firmly against the conveyor belt 325. A backing roller 386 is provided at one end of each side belt 377 (Figs. 15 and 16). Each of the backing rollers 386 is mounted on a shaft 387 that is journalled in a bracket 387a extending upwardly from the longitudinal channel members 357. At the opposite end of each side belt 377 is an upright bar 388 that serves as a guide for the belt.

Each side belt 377 is an endless belt whose inner portion travels from roller 366 to roller 376 at a rate of travel corresponding to the travel rate of the conveyor belt 325. The outer portion of each side belt 377 travels from the roller 376 to roller 366, being guided by horizontal and vertical return guide roller members 389 and 390 respectively (Figs. 18 and 19). Similarly the conveyor belt 325 is an endless belt that has a returning portion disposed below the stringers 359 as best shown in Fig. 18.

In order to prevent the nougat from sticking to the conveyor belt 325 and the side belts 377 a thin film of oil is applied to each of these belts and the belts are thoroughly washed and dried continuously during operation of the conveyor so that any particles of candy sticking to any of the belts are removed before the oil is applied.

As best shown in Figs. 6 and 20 an oil spray device generally indicated at 391 is provided to spray the film of oil on the conveyor belt 325. This sprayer device 391 comprises generally a plurality of nozzles 392 (Fig. 20) each of which is supplied with air and vegetable oil through pipes 393 and 394 respectively. Pipe 394 is fed from oil reservoir 395 (see Fig. 6). The nozzles 392 are mounted in a hood device 396 that comprises inner directing walls 397 that terminate closely adjacent to the belt 325 (Fig. 20), and outer walls 398, which together with the inner walls 397, form an annular exhaust chamber 399. An exhaust duct 400 communicates with the annular exhaust chamber 399 and leads to the intake side of an exhaust blower 401. The nozzles 392 thus spray evenly in the form of a fine mist a vegetable oil on the conveying surface of the conveyor belt 325 and the excess oil is exhausted through the duct 400 by means of the exhaust blower 401.

At the opposite end of the conveyor belt assembly is provided washing equipment for the conveyor belt 325 and the side belts 377 (see Figs. 18 and 19). The washing equipment for the conveyor belt 325 is enclosed in a housing 402 as best shown in Figs. 18, 19, 21, 23 and 24. This housing 402 includes a pair of spaced end walls 403 and 404 (Fig. 24), which walls are apertured to receive the conveyor belt 325 that passes in a direction from wall 403 to wall 404. The housing 402 is divided into a pair of chambers 405 and 406 by a baffle or wall 407 that extends downwardly from an upper wall 408 of the housing 402 and terminates short of the bottom wall 409 of the housing. The upper wall 408 may be removable so as to form a cover for the housing 402 but is preferably sealed in place by a gasket (not shown) so that the housing 402 is substantially water-tight. A screen 410 is slidably mounted in side brackets 411 and forms the lower wall of chamber 405.

As best shown in Figs. 21 and 24 a pair of vertically spaced water pipes 412 are supported in the chamber 405 in such a manner that the conveyor belt 325 is adapted to pass substantially midway between the spaced pipes 412. A plurality of jets or nozzles 413 are disposed along each of the pipes 412. Those nozzles 413 carried by the upper water pipe 412 are directed downwardly and the nozzles 413 connected to the lower water pipe 412 are directed upwardly so that as illustrated in Fig. 21 sprays of water can be directed by nozzles 413 against the upper and lower faces of the conveyor belt 325. It is noted that it is the return portion of the conveyor belt 325 that passes through the housing 402 for washing purposes as is illustrated in Figs. 18 and 19.

Figure 23:
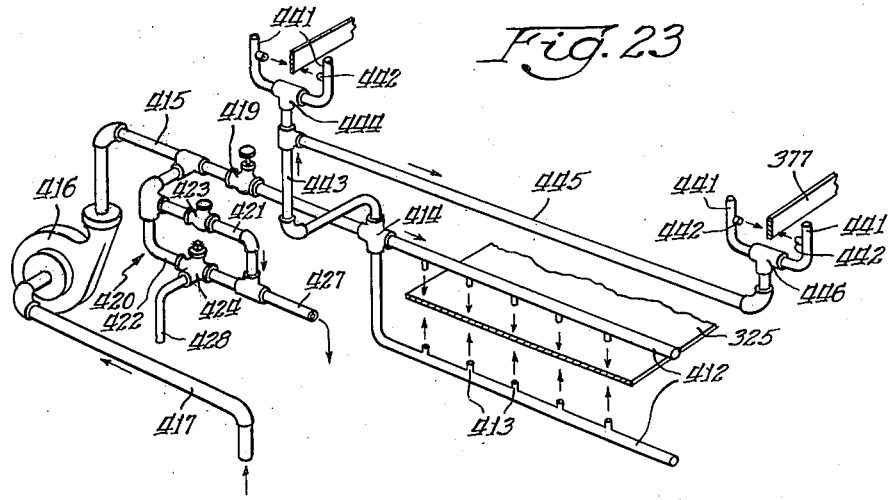
Fig. 23 is a more or less diagrammatic perspective view of the belt washing equipment employed in connection with the conveyor belt and the side belts.

Referring to Figs. 21 and 23 the upper and lower water pipes 412 are connected to a T-coupling 414 and to a main header pipe 415 that is fastened to the discharge end of a water pump 416. The suction side of pump 416 communicates through a pipe 417 to the lower portion of chamber 406 inside the housing 402. This lower portion of the chamber 406 serves as a sump for containing a supply of water indicated at 418 (see Figs. 21 and 24). A shut-off valve 419 is provided in the water header 415 and between the pipe 416 and the shut-off valve 419 is disposed a by-pass piping system generally indicated at 420 in Figs. 21 and 23. This by-pass piping system 420 includes a re-circulating pipe portion 421 and a discharge circuit 422. A pressure valve 423 is disposed in the recirculating portion 421 and a manually operated valve 424 is disposed in the discharge circuit 422.

Thus there is illustrated an effective washing apparatus for the conveyor belt 325 wherein water contained in the bottom of chamber 406 (Figs. 21 and 24) is drawn through pipe 417 (Figs. 21 and 23) and is fed by pump 416 to the water pipes 412. The water thus fed passes through nozzles 402 onto the conveyor belt 325 so as to wash from the conveyor belt any candy or any other solid particles thereon so as to dissolve the candy or wash the particles therefrom. Solid particles thus removed from the conveyor belt 325 are collected on the screen 410 (Figs. 21 and 24) and periodically this screen 410 is removed by sliding it along its supporting brackets 411 in the manner of a drawer for purposes of cleaning the screen. Suitable baffles 425 (Figs. 21 and 24) direct the solid particles onto the screen 410. It may be desirable that the water 418 be heated so as to provide hot water for cleaning the conveyor belt 325. To accomplish this heating pipes 426 may be disposed in the lower portion of chamber 406.

During the operation just described of supplying water to the spray nozzles 413 the shut-off valve 419 is disposed in its open or on position and the hand operated valve 424 (Fig. 23) is disposed in its closed position. Under these conditions the pressure valve 423 is likewise closed so that no water is flowing through the by-pass circuit 420. If, for any reason, it is desirable to close off the supply of water to the nozzles 413 shut-off valve 419 may be closed, in which case the pressure of the water discharged by pump 416 will open pressure valve 423 (assuming valve 424 to be closed) so as to pass the water through the recirculating portion 421 of the by-pass circuit 420, thereby discharging the water through pipe 427 (Figs. 21 and 23) back into the housing 402 in chamber 406. If it is desired to drain the water from chamber 406, valve 424 may be opened so as to pass the water from the water header 415 through the discharge portion 422 of the by-pass circuit 420, in which case the water is emptied into a drain (not shown) through discharge pipe 428 (Fig. 23). The conveyor belt 326 (Fig. 24) passing through wall 403 of the chamber 402 passes between squeegee-like rubber strips 429.

Each side belt 377 is provided with a washing unit generally indicated at 430 (see Figs. 18 to 21 inclusive, 23 and 25). Each belt washing unit 430 comprises a housing 431 that includes spaced end walls 432 and 433 provided with apertures 434 and 435 respectively, through which the side belt 377 passes when returning from roller 376 to roller 366. Sealing members in the form of rubber strips 436 are provided over the aperture 434 but are adapted to receive the belt 377 therebetween and a sealing member 437 is provided over aperture 435 but likewise is adapted to accommodate the belt 377. A dividing wall 438 divides the housing 431 into chambers 439 and 440.

As best shown in Figs. 21, 23 and 25 each housing 431 houses a pair of upwardly disposed, spaced water pipes 441, each of which is supplied with a jet or nozzle 442. The belt 377 is adapted to pass substantially midway between the spaced pipes 441 and the jets 442 are so arranged as to direct water against both sides of the belt 377. As previously mentioned there are two housing members 431, one being mounted on each side of the conveyor belt 325 and each housing 431 accommodates a pair of upstanding pipes 441. All four upstanding pipes 441 are fed from the water header 415 through a pipe 443 that is connected to the header 415 to the T-coupling 414. As best shown in Fig. 23 one pair of upstanding pipes 441 is mounted directly on top of pipe 443 by means of T-couplings 444. The other pair of pipes 441 is mounted on a branch pipe 445 through a T-coupling 446. Thus the water for the spray nozzles 442 is furnished from the supply of water 418 (Fig. 21) in the bottom of chamber 406 by the pump 416 and the water thus used in washing the side belts 377 is drained from each of the housings 431 through a return pipe 447 that empties into chamber 405 (see Fig. 24). Thus each of the belts 377 is thoroughly washed in its respective housing 431.

Referring now to Figs. 18, 19, 20 and 24 the conveyor belt 325 after being washed in chamber 405 passes into chamber 406 in which latter chamber is mounted a pair of vertically spaced air pipes 448 that are so arranged that the conveyor belt 325 passes approximately midway therebetween. Each of the air pipes 448 is provided with a plurality of nozzles or air jets 449, such that both the upper and lower faces of the conveyor belt 325 is subjected to blasts of air which are more or less uniformly directed throughout the entire width of the conveyor belt. Air is supplied from an air line 450 (Figs. 18, 19 and 24) that feeds through oil and water extractors 451 and into the air pipes 448 through piping indicated at 452. The air jets 449 are disposed relatively close to the belt 325 so as to supply sufficient air pressure against the belt to effectively dry the belt. Thus the conveyor belt 325 is washed and dried so that as it leaves the housing 402 the belt is clean and dry and is in condition to be oiled at the opposite end by means of the oil jets 392 in the manner previously described.

Figure 22:
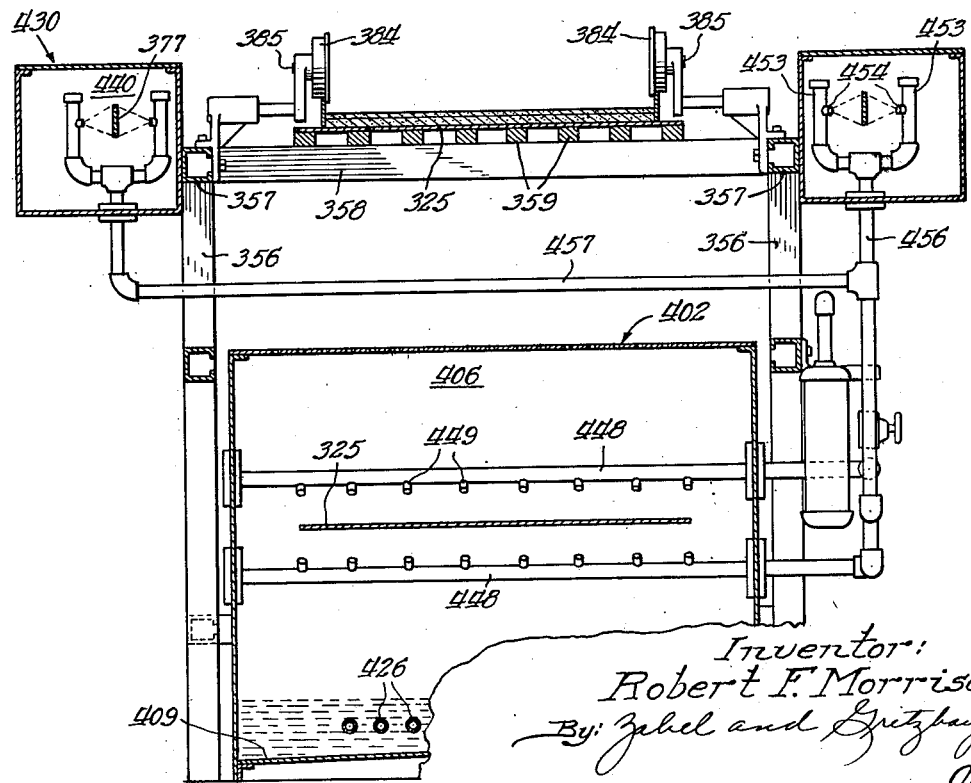
Fig. 22 is a transverse sectional view corresponding to Fig. 21, the view being taken on the line 22—22 of Fig. 19.

Similarly, each of the housings 431 is provided with drying apparatus for drying the side belts 377. This is best shown in Fig. 22 and 25 wherein chamber 440 of each housing 431 is provided with upstanding air pipes 453 that are provided with air jets 454 that are arranged to discharge air against both sides of the side belt 377. The air pipes 453 are connected to the air supply pipe 45 (see Fig. 24) through an oil and water extractor 455 and piping generally indicated at 456 and 457 (see Figs. 22 and 24). Thus the side belts 377 are washed and dried so that as they leave their respective washing unit 430 they are clean and dry, ready to be oiled. As best shown in Fig. 25 an oil bag 458 is mounted on each housing 431 closely adjacent to the aperture 435 on the exit wall 433 of the housing. The oil bags 458 may be in the nature of a sponge or fabric bag that can absorb a quantity of vegetable oil and each of such bags is so disposed with respect to its corresponding belt 377 that as the belt 377 leaves the washing unit 430 it engages the oil bag 458 so that a film of oil has wiped onto one face of each side belt 377. The face thus supplied with oil eventually becomes the inner face of the side belt 377 at the time it is disposed against the candy.

Control circuit

Thus there is provided a combination spreader device and conveyor unit that converts the mass of candy dough or mix into a uniform width and thickness ready to be cut. The relationship of the speeds of the spreader and the conveyor must at all times be kept constant in order to maintain uniformity in thickness of the nougat spread. Provisions are made for varying the speeds of the spreader and the conveyor, however, while maintaining this constant relationship between the two. This is done by an electrical control circuit that is illustrated diagrammatically in Fig. 26.

Figure 26:
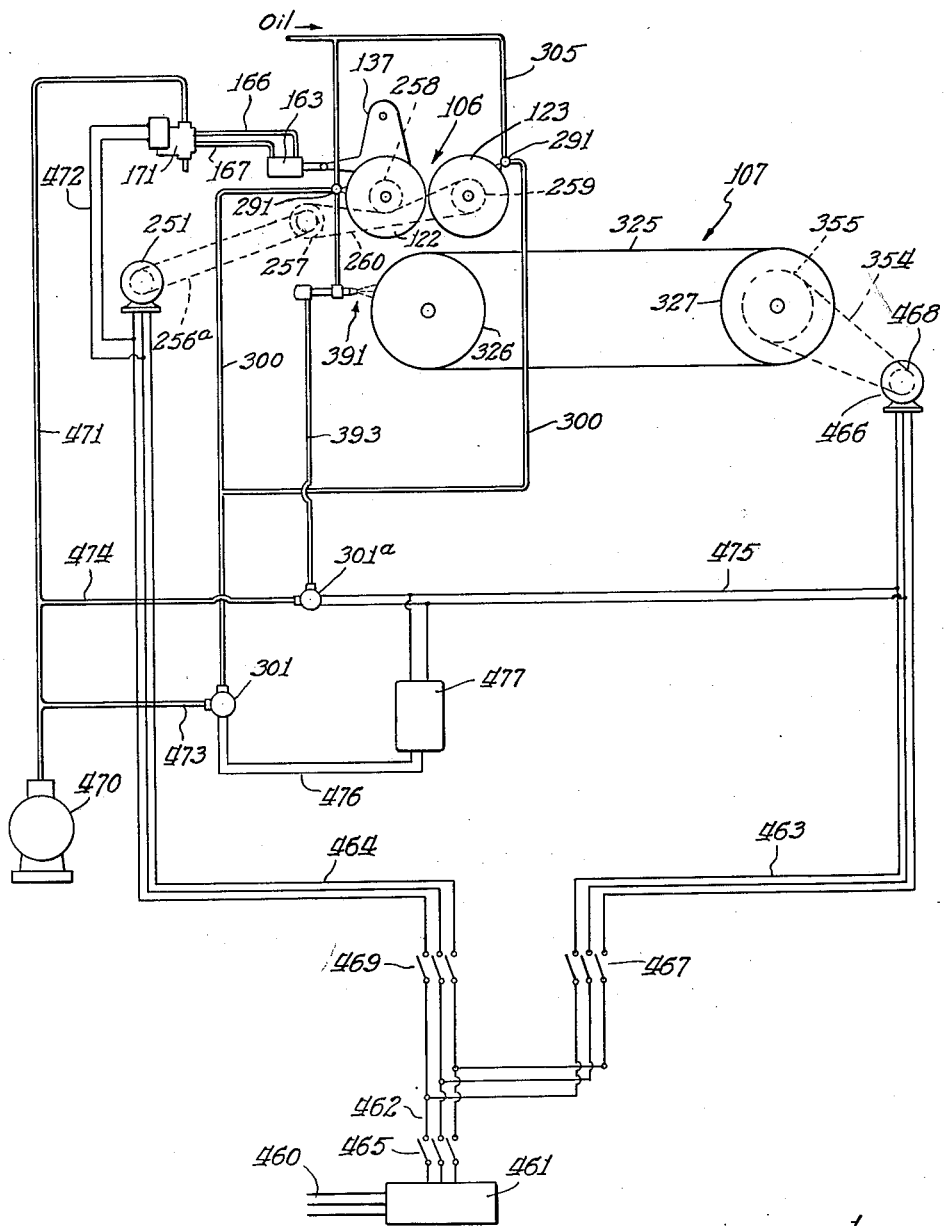
Fig. 26 is a schematic view showing the control and operating electric circuits for the spreader and conveyor.

Referring now to Fig. 26 of the drawings the control circuit is fed from electric power mains indicated at 460 which feed a frequency changer 461. The frequency changer 461 is connected through wiring 462 to two circuits indicated at 463 and 464. A magnetic or manual switch 465 is located in the wiring 462 for opening and closing the main circuit. The circuit 463 connects a squirrel cage or synchronous motor 466 to the wiring 462 and a manually or magnetically operated circuit breaker 467 is disposed in this circuit 463. The motor 466 is adapted to drive the roller 327 of the conveyor assembly 107 through the sprocket chain 354 that operates about the sprocket 355 on the end of the shaft supporting the roller 327 and a sprocket 468 on the end of the shaft for the motor 466.

The circuit 464 connects the motor 251 to the wiring 462 and this circuit 464 includes a manually or magnetically operated circuit breaker 469. This motor 251 which drives the spreader rollers 122 and 123 may be a squirrel cage synchronous motor having a controlled frequency. The frequency of both the motor 466 and the synchronous motor 251 may be varied by manipulation of the frequency changer 461 so as to vary the speeds of operation of the spreader device 106 and the conveyor 107 though there is at all times a constant speed ratio as between the motor 466 and the synchronous motor 251. This constant speed ratio as between these two motors insures a constant relationship in speed as between the spreader device 106 and the conveyor 107 irrespective of the setting of the frequency changer 461.

As previously mentioned the spacing as between the rollers 122 and 123 can be varied between a zero or no-space condition to some predetermined open position whereby the candy dough or mix can be fed between the rollers under controlled conditions for the thickness of the candy ribbon. This movement of the roller 122 is brought about by operation of the air cylinder 163 and as shown in Fig. 26 a solenoid operated valve 171 selectively regulates the flow of air into the air cylinder 163 through the pipes 166 or 167, this air being furnished by an air compressor 470 through an air line 471. The solenoid valve 171 is connected to the circuit 464 through a double conductor line 472. Thus whenever the circuit 464 is energized by virtue of the closing of the master switch 465 and the circuit breaker 469, the circuit 472 is likewise energized so as to manipulate the valve 171 to the condition corresponding to open or spaced position of the rollers 122 and 123. In other words, whenever the synchronous motor 251 is receiving current from the power mains 460 the rollers 122 and 123 of the spreader device 106 are in their separated condition and are operating to spread the ribbon of nougat onto the belt 325 of the conveyor 107.

The spray devices 291 that are adapted to spray oil on the surfaces of rollers 122 and 123 are fed by means of the ejectors 299 (see Fig. 7) that are air operated. This air is fed from the air compressor 470 (Fig. 26) through a pipe 473, solenoid valve 301 and pipe line 300, the latter pipe line being divided to supply spray devices 291. Similarly the spray device 391 that supplies a film of oil on the belt 325 of the conveyor 107 is fed with air that is furnished by the air compressor 470 through an air line 474, solenoid valve 301a and pipe 393.

The solenoid valve 301a is electrically operated through a two-line circuit 475 that is electrically connected to the circuit 463. The solenoid valve 301 is electrically connected to the circuit 463 through a two-line circuit 476 that is connected in parallel with the solenoid valve 301a across any two lines of circuit 475. A timer 477 may be provided in this circuit 476 so as to provide intermittent operation of the spray devices 291. This timer 477 may be of any suitable type which will alternately energize and deenergize the solenoid 301 while providing a definite time interval for the energized and deenergized conditions. Thus there is provided for the oil spray devices 291 and 391 an operating circuit that is energized at all times when current is flowing through the circuit 463 to the motor 466. In this manner the spray devices are in condition to supply a thin film of oil on the rollers 122 and 123 and the belt 325 at all times when these rollers and the belt are in operation.

It is recognized, of course, that the rollers 122 and 123 are provided with chilled surfaces so that the oil deposited thereon by the spray devices 291 becomes congealed when it is sufficiently chilled. Because of this fact it may not be necessary to have a continuous flow of oil through the spray devices 291 since there may be a sufficient coating of congealed oil to permit the spreading device 106 to operate for definite periods of time without requiring the oil film to be replenished. Thus the timer 477 is provided in the circuit for the solenoid valve 301 and it is preferable that this timer 477 have provisions for adjustment so that the cycle of operation of the solenoid valve may be varied.

I claim:

1. For use in spreading candy, a pair of parallel, cylindrical spreader rollers, means rotatably supporting the rollers in spaced relationship, a disc disposed at each end of the pair of rollers with the flat face of the disc against the ends of the rollers and spanning the space between the rollers, means mounting the discs for rotation, means connected in driving relationship with the rollers for rotating the rollers in opposite directions so that their adjoining faces are moving downwardly, means connected in driving relationship with the discs for rotating the discs, channel means in the rollers in heat exchange relationship with the peripheral surfaces, and pipe means communicating with the channel means for conducting a coolant into the channel means.

2. For use in spreading candy, a pair of parallel, cylindrical spreader rollers, means rotatably supporting the rollers in spaced relationship, a disc disposed at each end of the pair of rollers with the flat face of the disc against the ends of the rollers and spanning the space between the rollers, means mounting the discs for rotation, means connected in driving relationship with the rollers for rotating the rollers in opposite directions so that their adjoining faces are moving downwardly, means connected in driving relationship with the discs for rotating the discs, channel means in the rollers in heat exchange relationship with the peripheral surfaces, and pipe means communicating with the channel means for conducting a coolant into the channel means, each disc being provided with a passage therein in heat exchange relationship with the face abutting against the rollers, and pipe means for conducting a coolant into said passage.

3. For use in spreading candy, a pair of parallel, cylindrical rollers, fixed means for rotatably mounting one roller, movable means for rotatably mounting the second roller in horizontal spaced relationship with respect to the first roller, means operatively connected to the movable means for adjustably fixing the position of the movable means, means in driving relationship with the rollers for rotating the rollers in opposite direction with the adjacent roller surfaces moving downwardly, a disc disposed at each end of the pair of rollers with the flat face of the disc against the ends of the rollers, means mounting the discs for rotation with the axis of rotation disposed above the level of the axes of the rollers, the discs being disposed to span the space between the rollers and means in heat exchange relationship with the cylindrical faces of the discs for chilling such faces.

4. The combination of a pair of parallel spreader rollers, means mounting said spreader rollers in parallel relationship, said mounting means providing relative lateral movement as between the rollers so that the rollers may alternatively be disposed together with their surfaces in substantial engagement or in spaced relationship with a feeding channel provided between the spaced rollers, means separating the rollers into this latter spaced relationship, motor means in driving relationship with the spreader rollers including a motor and a circuit therefor, and means responsive to the circuit for operating the roller separating means when the motor means is energized so that the spreader rollers are spaced apart to provide a feeding channel therebetween at all times when the motor means is energized.

5. The combination of a pair of parallel spreader rollers, means mounting said spreader rollers in parallel relationship, said mounting means providing relative lateral movement as between the rollers so that the rollers may alternatively be disposed together with their surfaces in substantial engagement or in spaced relationship with a feeding channel provided between the spaced rollers, means separating the rollers into this latter spaced relationship, a conveyor below the spreader rollers, motor means in driving relationship with the spreader rollers and the conveyor, a circuit for the motor means, and means responsive to the circuit for operating the roller separating means when the motor means is energized so that the spreader rollers are spaced apart to provide a feeding channel therebetween at all times when the motor means is energized.

6. The combination of a pair of parallel spreader rollers, means mounting said spreader rollers in parallel relationship, said mounting means providing relative lateral movement as between the rollers so that the rollers may alternatively be disposed together with their surfaces in substantial engagement or in spaced relationship with a feeding channel provided between the spaced rollers, means separating the rollers into this latter spaced relationship, a conveyor below the spreader rollers, and including a conveyor belt, oiling means for applying a thin film of oil on the conveyor belt, regulating means for turning the oiling means "on" and "off," motor means in driving relationship with the spreader rollers and the conveyor, a circuit for the motor means, means responsive to the circuit for energizing the oil regulating means, and means responsive to the circuit for operating the roller separating means, the last two named means being effective in separating the spreader rollers and in turning on the oiling means at all times when the motor means is energized.

7. For use in spreading candy, a pair of parallel, cylindrical spreader rollers, means for chilling the peripheral faces of the rollers, means rotatably supporting the rollers in spaced relationship, means for rotating the rollers in opposite directions, a disc disposed at each end of the rollers having a flat surface substantially engaging the adjacent roller ends and spanning the space between the rollers, means for chilling the faces of the discs, means mounting each disc for rotation about an axis disposed parallel to the axes of the rollers, and means for rotating the discs.

ROBERT F. MORRISON.

REFERENCES CITED

The following references are of record in the file of this patent:

UNITED STATES PATENTS

| Number | Name | Date |
|---|---|---|
| 1,931,614 | Kirchhoff | Oct. 24, 1933 |
| 1,945,755 | Scruggs, Jr. | Feb. 6, 1934 |
| 2,034,346 | Lauterbur | Mar. 17, 1936 |
| 2,224,430 | Garbutt | Dec. 10, 1940 |

FOREIGN PATENTS

| Number | Country | Date |
|---|---|---|
| 193,479 | Great Britain | Feb. 22, 1921 |